United States Patent
Berger et al.

(10) Patent No.: US 7,047,134 B2
(45) Date of Patent: May 16, 2006

(54) METHOD OF SELECTING A SOIL STABILIZATION PROTOCOL FOR A CONSTRUCTION SITE

(75) Inventors: Eric Berger, Fort Worth, TX (US); Diethelm Walter, Mettmann (DE)

(73) Assignee: Chemical Lime Company, Fort Worth, TX (US)

( * ) Notice: Subject to any disclaimer, the term of this patent is extended or adjusted under 35 U.S.C. 154(b) by 157 days.

(21) Appl. No.: 10/807,495

(22) Filed: Mar. 23, 2004

(65) Prior Publication Data

US 2005/0216195 A1 Sep. 29, 2005

(51) Int. Cl.
*G01V 3/38* (2006.01)
*G06F 19/00* (2006.01)

(52) U.S. Cl. .......................... 702/5; 324/329; 324/334; 702/2; 702/100

(58) Field of Classification Search .................. 702/2, 702/5, 7, 100; 324/329, 334, 72, 754
See application file for complete search history.

(56) References Cited

U.S. PATENT DOCUMENTS

| | | | |
|---|---|---|---|
| 4,070,612 A | 1/1978 | McNeill et al. | 324/6 |
| 5,175,500 A | 12/1992 | McNeill | 324/334 |
| 5,654,637 A | 8/1997 | McNeill | 324/329 |
| 6,853,937 B1 * | 2/2005 | Shibusawa et al. | 702/100 |

OTHER PUBLICATIONS

BA -J.D. McNeill, "Electrical Conductivity of Soils and Rocks", Oct. 1980, 22 pages, BB -Thomas E. Petry and Eric Berger, "Equipment and Methods for Field Screening Indicating Soluble Sulfates", Oct. 2-5, 2002, BC—"Ground Conductivity Meter Operating Manual", Mar. 1999, Geonics Limited, 33 pages.

* cited by examiner

*Primary Examiner*—John Barlow
*Assistant Examiner*—John Le
(74) *Attorney, Agent, or Firm*—Charles D. Gunter, Jr.; Stephen S. Mosher

(57) ABSTRACT

There is disclosed a method of selecting, in real time, a soil stabilizing protocol for clay-bearing soils occurring in construction sites. The method includes the steps of: obtaining soil conductivity data values at locations within a defined site without disturbing the surface of the soil; correlating the soil conductivity data values with corresponding estimates of soluble sulfate levels; recommending a calcium-based soil stabilizing protocol if the estimated level of soluble sulfates is less than a predetermined threshold; and performing a laboratory analysis of soil samples from selected portions of the defined site when the estimated soluble sulfate concentration equals or exceeds the predetermined threshold.

15 Claims, 3 Drawing Sheets

METHOD OF SELECTING A SOIL STABILIZATION PROTOCOL FOR A CONSTRUCTION SITE

BACKGROUND OF THE INVENTION

1. Field of the Invention

The present invention generally relates to measuring soil characteristics and, more particularly, to using measurements of soil conductivity to (a) estimate in real time the suitability of calcium-based soil stabilization methods and (b) estimate the need for laboratory analysis of soil samples.

2. Description of the Prior Art

Stabilization of clay soils at construction sites using low-cost, calcium-based soil stabilization methods such as the application of lime, Portland cement or flyash, is a routine practice to prevent pavement or structural distresses in structures built upon such clay soils. These distresses, which are expensive to remediate, arise because of the presence of expansive minerals such as ettringite and thaumasite in the soil. These minerals are formed in clay soils having significant soluble sulfate ($SO_4$) content when calcium, aluminum, and water are also present. Aluminum, in the form of aluminum silicate ($Al_2SiO_3$), is a prevalent constituent of clay soils, and calcium is present in the materials used to stabilize such soils, often in the presence of water. Thus, in the right combinations, these three components (aluminum, calcium and water), plus sulfate compounds present in the soil, may induce the formation of expansive minerals, which can absorb and hold very large amounts of water, swelling up to 250% by volume. Under these conditions, the sulfate-induced distress can cause extensive damage to structures supported on such unstable soils. Therefore, when using lime (CaO), e.g., to stabilize clay soils that have significant soluble sulfates, it is recommended to apply the lime as a lime slurry. The lime slurry (to provide sufficient water for the expansive minerals to form) is applied to the clay soil, followed by sufficient 'mellowing' time (typically one to seven days) to pass before compacting of the soil is performed. In this way, the expansion is allowed to reach an equilibrium condition before paving or other structures are constructed on the soil.

Sulfate-induced distress (sometimes called sulfate heave, due to the formation of ettringite) can arise both because of the presence of sulfates in soils treated using calcium-based materials and because of an uneven distribution of expansive minerals in the soil of the construction site being treated. Soil sampling and laboratory analysis of the samples can be used to map a site to determine its composition in order to decide whether to apply soil stabilization to remediate the site. However, such testing is laborious and expensive, involving disturbing the site to take core samples, one sample at a time, handling and analyzing the samples, etc. These disadvantages are magnified by the fact that sulfates tend to occur unevenly in seams in the soil. Thus, routine testing using a practical density of measurements often misses the location and extent of such a seam because of an insufficient number of samples. Such testing may result in treating a much larger area than necessary or in overlooking an area that needs to be treated because it was not discovered, or worse, causing sulfate heave in areas of the site treated with lime slurry that also have an undetected high concentration of soluble sulfates. Yet, increasing the number of samples raises the costs of the survey to locate sulfate-bearing soils that must be treated with soil stabilization techniques.

What is needed is a non-intrusive, real-time method of testing or screening a construction site for the presence of sulfate-bearing soil that will enable a reliable determination of the need for conventional soil stabilization only in those portions of the construction site that need the treatment. Further, the method should enable identification of areas within the construction site in which soil samples must be taken to determine the sulfate concentration thereof and assist in the selection of the best stabilization method for the particular area.

SUMMARY OF THE INVENTION

Experimentation with several devices for measuring soil conductivity and the techniques of their use, and devising a way to interpret the results of test data obtained, has resulted in the development of a method for selecting, in real time, a soil stabilizing protocol for construction sites. The inventive method, based on screening construction sites for the presence of soluble sulfate compounds in clay-bearing soils, does not involve time-consuming and expensive chemical analysis of soil samples taken from the site. Moreover, the method can be performed on a typical site by one person in a few hours' time or less, and the method is readily adaptable to a programmable process that controls the measurement activity and records the data for analysis. Further, the method is amenable to using location data provided by a global positioning satellite (GPS) system to enable mapping of the soil measurement data. The screening method identifies the location and concentration of sulfates in a surveyed area and provides an indication of when calcium-based soil stabilization treatment, such as the application of a lime slurry, is appropriate for the site and when it is not recommended. In the latter case, the sulfate-rich seams are localized with sufficient specificity by the method of the present invention to considerably reduce the expense of chemically analyzing soil samples from the sulfate-rich seams to enable selection of the best stabilizing method.

Accordingly there is disclosed a method of selecting in real time a soil stabilizing protocol for clay-bearing soils occurring in construction sites, comprising the steps of: obtaining soil conductivity data values at selected locations within a defined site without disturbing the surface of the soil; correlating the soil conductivity data values with corresponding estimates of soluble sulfate levels; recommending a calcium-based soil stabilizing protocol if the estimated level of soluble sulfates is less than a predetermined threshold; and performing a laboratory analysis of soil samples from selected portions of the defined site wherein the estimated soluble sulfate concentration equals or exceeds the predetermined threshold.

DETAILED DESCRIPTION OF THE INVENTION

Figure 1:
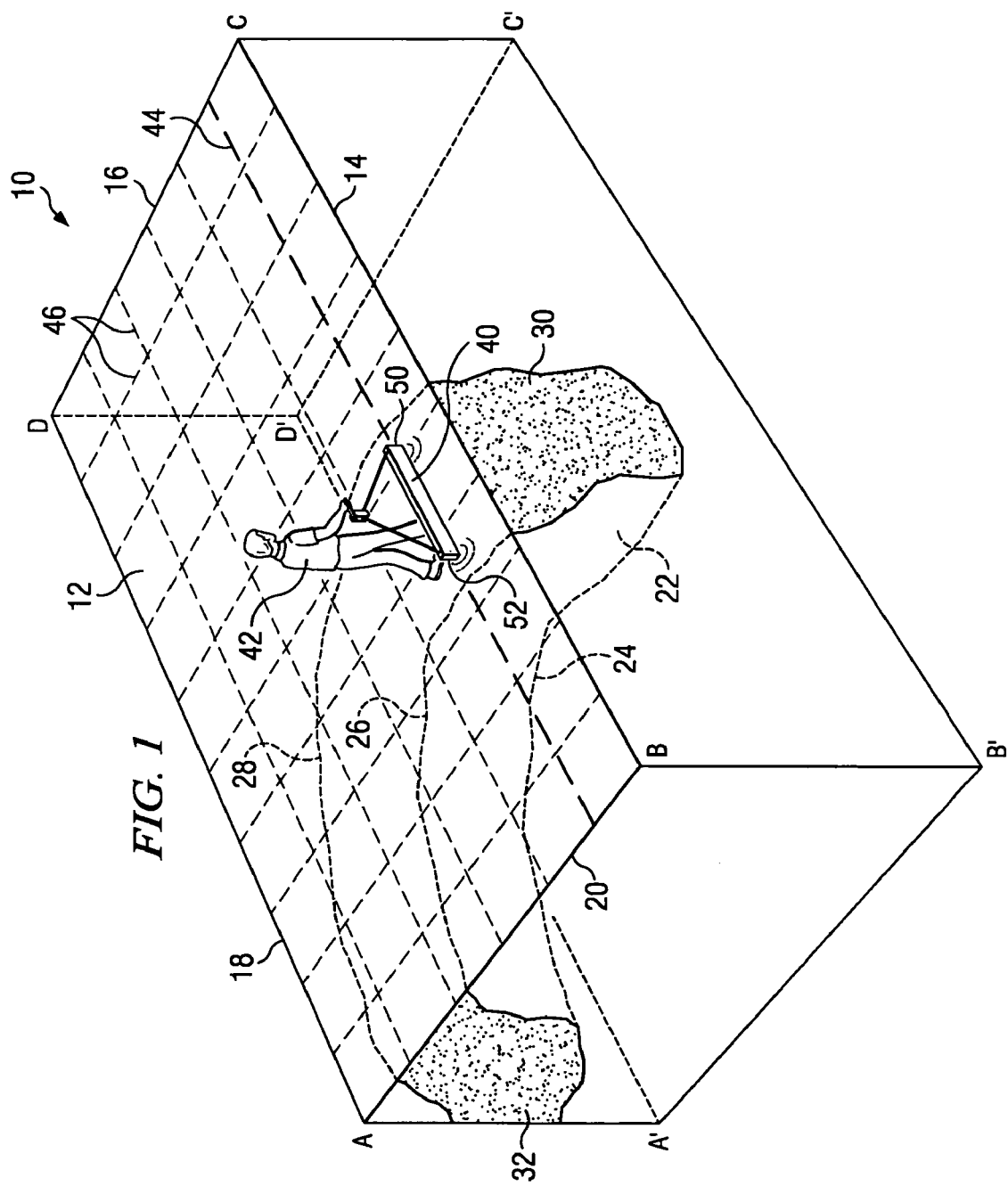
FIG. 1 illustrates a pictorial view of a cross section of a construction site having a seam of high sulfate concentration in a clay-bearing soil and an operator performing a soil conductivity survey according to the method of the present invention.

Referring to FIG. 1, there is illustrated a pictorial view of a cross section of a construction site 10 having a seam of high sulfate concentration near the surface of the site in a clay-bearing soil and an operator performing a soil conductivity survey according to the method of the present invention. The drawing is not to scale, the depth dimension being exaggerated for clarity. The construction site 10 has a surface 12 that is bounded by borders 14, 16, 18 and 20, which intersect at the corners A, B, C and D, forming a rectangular shaped site 10. A portion of the depth of the construction site 10 is indicated by the corners A', B', C' and D', which respectively locate the corresponding points beneath the surface 12 of the site 10 directly below the corners A, B, C and D. A seam 22 of sulfate-rich soil runs through the site 10 along and just below the surface 12, passing across the border 20 and the border 14 as it curves across and through the site 10. A cross-section 30 of the seam 22 is shown in the vertical plane that extends below the border 14. Similarly, a cross-section 32 of the seam 22 is shown in the vertical plane that extends below the border 20.

Continuing with FIG. 1, an electromagnetic ground conductivity meter 40 is shown being carried by an operator 42, walking along a path 44 that may be a portion of a surveying grid 46 superimposed upon the surface 12 of the construction site 10. The ground conductivity meter is preferably a Model EM38, manufactured by Geonics Limited, located in Mississauga, Ontario, Canada L5T 1C6. The Geonics Limited firm can also be accessed at www.geonics.com. For a description of experimental work using this instrument, see the article entitled "Equipment and methods For Field Screening Indicating Soluble Sulfates," by Dr. Thomas M. Petry, P.E. and Eric Berger, P.E., published in the *Proceedings* of the Texas Section of the American Society of Civil Engineers for the Fall Meeting, Oct. 2–5, 2002, which article is incorporated herein by reference.

The Model EM38 soil conductivity meter is a portable unit contained in an elongated tube, one meter in length, which is carried along and may be placed parallel to the surface 12 of the site 10 and oriented along a grid line or path 44. In use, the measurements are made with the EM38 without disturbing the surface of the earth. No holes or core samples need be dug to take readings with the EM38. The testing is completely non-invasive and non-destructive. This is an important advantage because it enables a low-cost survey to be made and requires no other tools or personnel to perform the survey. Briefly, the device operates as follows. A transmitter antenna at one end of the meter radiates a signal generated within the EM38 into the earth. The magnetic field produced by the signal induces galvanic currents to flow in any nearby soil that is conductive—i.e., has a relatively low resistivity—by virtue of the presence of salts, such as sodium chloride (NaCl) and sulfates (e.g., $SO_4$), in the soil. Magnetic fields set up in the soil by the galvanic currents themselves are then sensed or picked up by a receiving antenna in the opposite end of the meter and displayed on a readout in milliSiemens per meter (mS/m), a unit of soil conductivity.

Experimentation has shown that there is a fairly well defined relationship between the conductivity of the soil and the concentration of soluble sulfates in the soil. For example, a soil conductivity measurement of 280 mS/m correlates with a fairly high probability (62%) to a sulfate concentration of approximately 3000 parts-per-million (ppm) or above. The present invention exploits this relationship in a protocol that has been developed to predict the need for and suitability of calcium-based soil stabilization methods for a construction site. For example, sulfate concentrations less than 3000 ppm are readily treatable using calcium-based soil stabilization methods. The soils in those areas indicated by the screening steps as having a sulfate concentration above 3000 ppm (i.e., wherein the soil conductivity is above 280 mS/m) should be sampled and the samples analyzed chemically to determine their actual sulfate concentration. This is because the soil conductivity meter does not directly provide an accurate measure of the actual soluble sulfate concentration. Rather, the soil conductivity meter measures soil conductivity, which is affected by the presence of several constituents in the soil including soluble sulfates. However, this ability to accurately measure soil conductivity makes the EM38 particularly useful as a screening instrument on construction sites.

Figure 2:
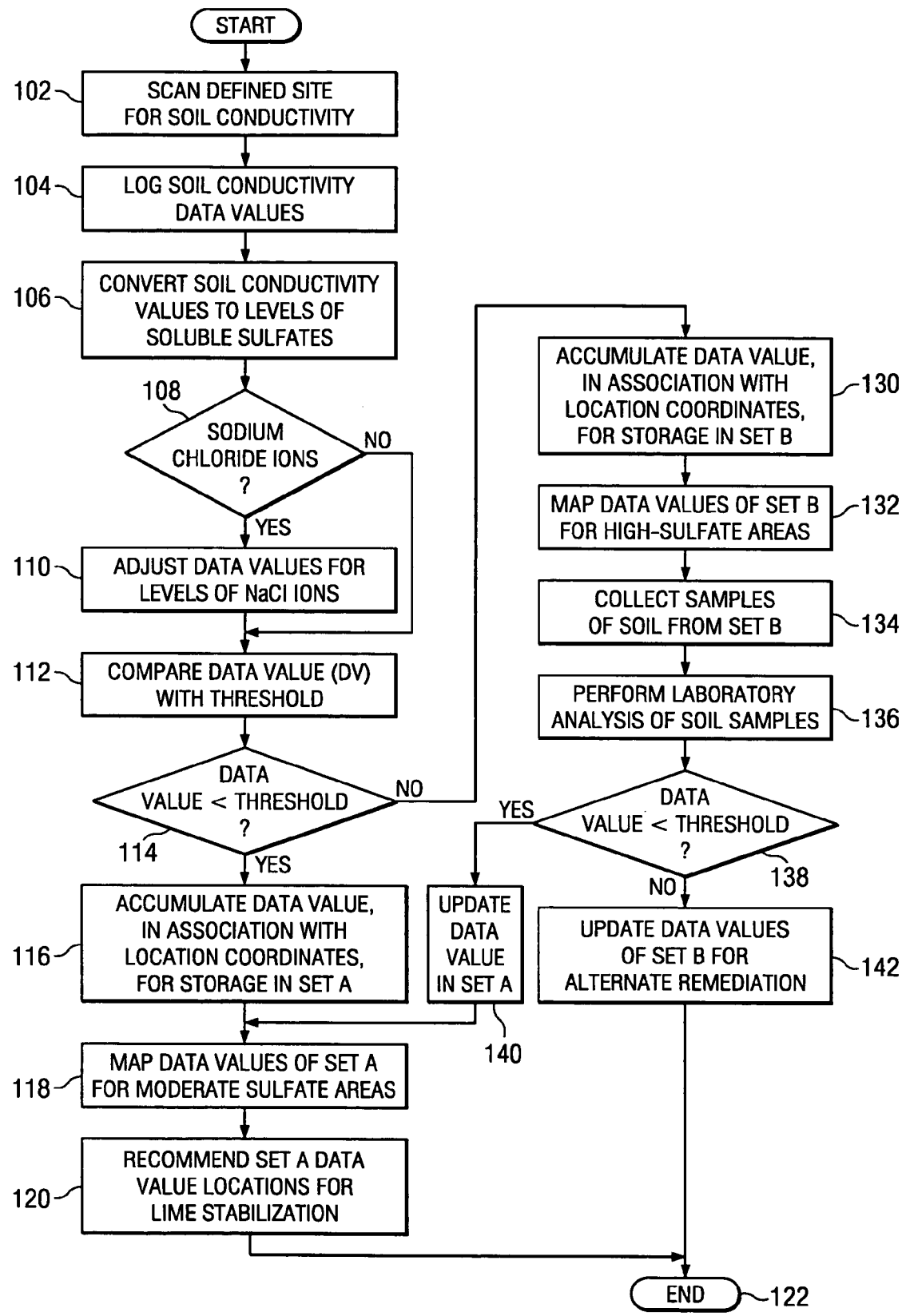
FIG. 2 illustrates a flow diagram of the method of performing a soil conductivity survey according to the present invention.

Referring to FIG. 2, there is illustrated a flow diagram of the method of performing a soil conductivity survey, which includes a protocol for the interpretation and application of the instrument readings as adapted to construction sites, according to the present invention. The Flow begins with a Start block 100, followed by an operation in step 102 to scan the defined construction site to obtain measurements of the soil conductivity at a plurality of selected intervals over the surface of the site. For example, a grid may be superimposed over the surface 12 of the site 10, to identify the points on the surface where data value readings will be taken. The mesh of the grid—i.e., the spacing of the data points—may be selected depending on such factors as the dimensions of the site, the expected characteristics to be identified by the magnetometer, the level of detail or resolution of the data required, and so on. Next, in step 104, the soil conductivity data values are logged—i.e., recorded or stored in some form, and in association with information identifying the location or position of the reading on the site 10—for later use. Information on the location of the readings may be in the form of coordinates from a global positioning system (GPS) device or from coordinates defined relative to a datum or baseline, for example. The information may be entered manually, or automatically when a computer-controlled system is used in conjunction with the EM38. In this way a map of the soil conductivity data values is developed. From such a map it is a simple matter to note the high-sulfate areas on the map in which soil samples may be required.

Continuing with FIG. 2, in step 106, the data values for the soil conductivity are converted to levels of sulfate concentration to enable a direct indication of the need for calcium-based soil stabilization. As indicated previously, this conversion is in the nature of a threshold defined for soil conductivity values above 280 mS/m. That is, if the soil conductivity reading exceeds the 280 mS/m figure, then it indicates, with a high probability, that the concentration of soluble sulfates in the soil at that location exceeds 3000 ppm.

One material often present in soils that affects the soil conductivity is sodium chloride (NaCl). As is well known, sodium chloride ions are good transporters of electric current, and its presence in the soil contributes to the readings measured by the soil conductivity meter. The degree of influence upon the readings may be accounted for in steps 108 and 110 of FIG. 2. In step 108, the soil is tested for the presence of NaCl ions. If they are present, the data values read by the soil conductivity meter may be adjusted accordingly in step 110. It is somewhat like adjusting for the level of background noise in an electrical measurement. The adjustment is made by dividing the estimated level of sulfates by a factor given by the average number of soluble sulfates divided by the total number of soluble ions (the sum of soluble sulfates+sodium chloride ions) in the soil of each of a plurality of representative soil samples of the defined site 10 as determined by laboratory analysis of the representative soil samples from the defined site 10.

Following step 110, or step 108 if no sodium chloride ions are present in the soil at the site 10, the flow proceeds to step 112 to compare the data value read by the soil conductivity meter 40 with the threshold level of 280 mS/m. If, in step 114, the data values are less than the threshold, the flow advances to step 116 to accumulate the data value in association with location coordinates in a storage medium for later use. This data may be stored in a table named Set A, for convenience. A first set, "Set A," includes data values for soil having sulfate concentrations below 3000 ppm and would thus be amenable to the conventional calcium-based soil stabilization method. After step 116, the data values in Set A may be plotted on a map in step 118. The map developed in step 118 may then be a convenient form in which to recommend, in step 120, those portions of the defined site 10 which may be treated with calcium-based stabilization, e.g., with lime slurry. After making the recommendation available in step 120, the process ends at step 122.

Returning to step 114 in FIG. 2, and if it was determined there that a given data value is not below the threshold of 280 mS/m, the flow skips to step 130, where the data values may be accumulated, in association with location coordinates in another storage medium location, identified as a second set, "Set B." Set B is designated to accumulate data values that exceed the threshold of 280 mS/m. The data values of Set B may also be plotted or mapped in step 132 to provide an easily perceived and evaluated presentation of the results of the soil conductivity screening. These data values record a level of sulfates that is considered high and for which it cannot be recommended that conventional calcium-based stabilization are appropriate without determining the actual sulfate concentration. Thus, the data values in Set B must be subjected to chemical analysis of soil samples from the mapped areas in a laboratory. The samples are collected in step 134 and analyzed in step 136.

Returning to FIG. 2, the actual sulfate concentrations are evaluated in step 138 to determine if the level is below or above the threshold of 3000 ppm. If the lab results show that a sample contains less than 3000 ppm of sulfates, the location represented by that soil sample is part of the Set A data; thus the data value is transferred to Set A. Any other data values shown to be below the threshold may then be transferred to Set A to update the Set A map for the site. In effect, the site area corresponding to Set A is redefined. If the lab results show that the sample contains more than 3000 ppm, the data value is used to update the value stored in Set B. These values are used to update the Set B map in step 142, as before for the Set A data values in step 118. The Set B map may then be reviewed and evaluated for alternate remediation as necessary. After updating Set B with the actual measured sulfate values in step 142, the flow ends at step 122.

Figure 3:
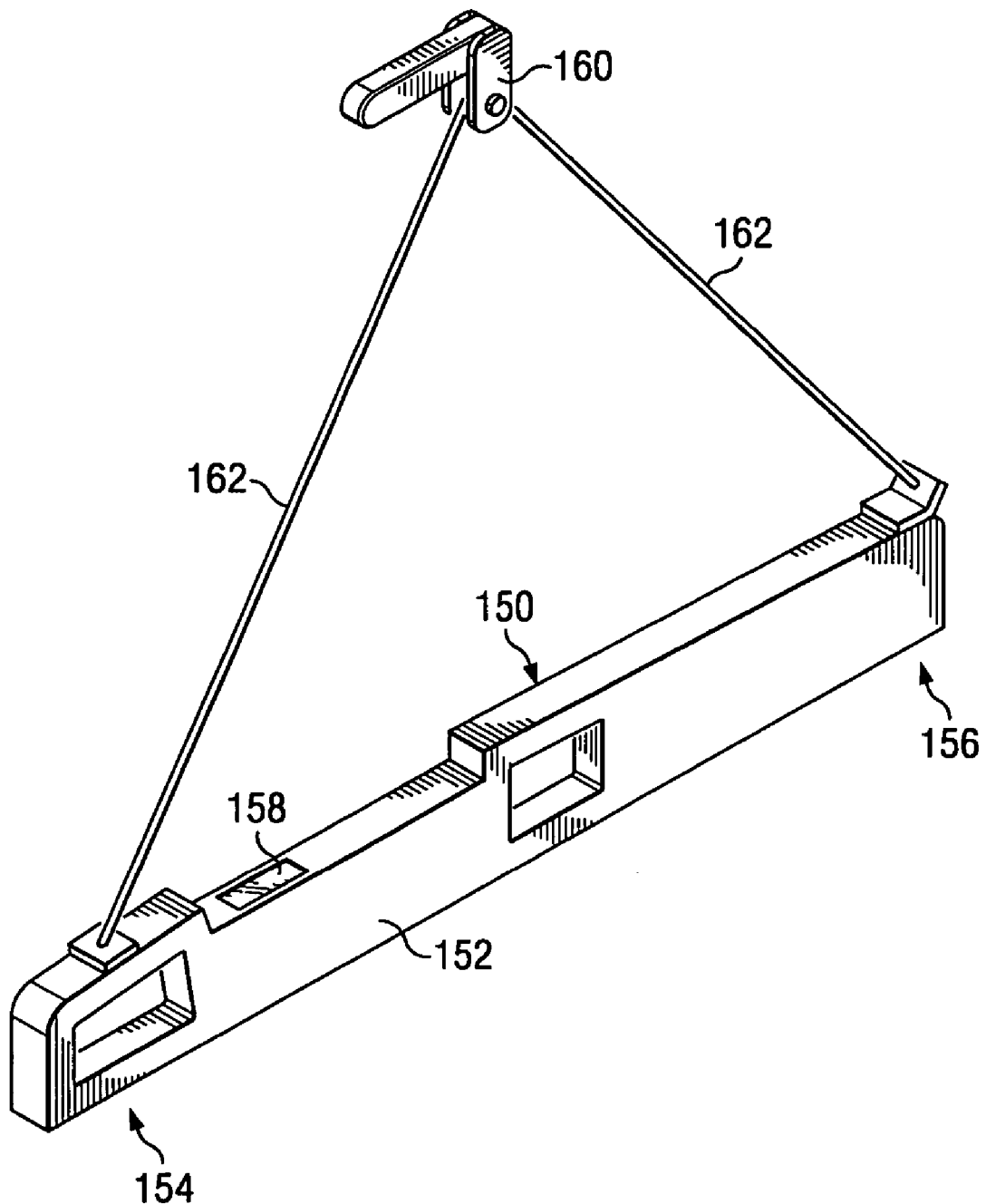
FIG. 3 illustrates one embodiment of an electromagnetic soil conductivity meter for use in practicing the method of the present invention.

Referring to FIG. 3, there is illustrated one embodiment of an electromagnetic soil conductivity meter 150 for use in practicing the method of the present invention. The figure shows some of the general features of the Model EM38 Ground Conductivity Meter manufactured by Geonics Ltd. of Mississauga, Ontario, Canada. The meter includes a body 152, which is approximately 42 inches in length. Within the first end 154 is a primary source coil which radiates a 14.6 KHz signal into the soil. Within the second end 156, opposite the first end 154, is a sensor coil which detects the presence of a magnetic field in the soil that is set up by eddy currents induced in the conductive portions of the soil by the signal from the primary source coil at the first end 154. The detected signal is converted to a soil conductivity reading displayed on the readout 158, in units of milliSiemens per meter. The meter 150 may be carried by a handle 160, which is attached to the first and second ends 154, 156 of the meter body 152 by rods 162. In use, after calibration, the meter 150 is carried to the desired measurement position, placed on the ground and the reading taken from the display 158.

It will be recalled that the soil conductivity meter does not actually measure the sulfate concentration; however, it does enable a reliable inference to be made from soil conductivity data whether the sulfate concentration is high or low. If the sulfate concentration is indicated to be high, then the recommendation is that chemical analysis of soil samples should be performed to determine the actual level. However, it will be appreciated that the method of the present invention provides a useful way to estimate the sulfate levels rapidly and at relatively low cost, enabling many projects to proceed without the delay that might accompany sending the soil samples to a lab for testing. Since sulfates tend to occur in seams, often occupying on a small fraction of the total area of the construction site 10, the location of seams of high sulfate levels may be such as to not impede the construction plans for the site. Further, since the seams of sulfate compounds are usually a small portion of the site area, the sampling and analysis of samples from the seamed area represents only a relatively small expense of time and resources. Moreover, the data from the chemical analysis enables the stabilization treatment to be tailored to the particular concentrations of sulfates at the site.

While the invention has been shown in only one of its forms, it is not thus limited but is susceptible to various changes and modifications without departing from the spirit thereof.

What is claimed is:

1. A method of selecting in real time a soil stabilizing protocol for clay-bearing soils occurring in construction sites, comprising the steps of:

obtaining and logging soil conductivity data values at selected locations within a defined site without disturbing the surface of the soil thereof;

correlating the soil conductivity data values with corresponding estimates of soluble sulfate levels;

recommending a calcium-based soil stabilizing protocol if the estimated level of soluble sulfates is less than a predetermined threshold;

performing a laboratory analysis of soil samples from selected portions of the defined site wherein the estimated soluble sulfate concentration equals or exceeds the predetermined threshold; and wherein the step of obtaining comprises the steps of:

scanning the defined site, without disturbing the surface of the soil, with a portable magnetometer to provide a plurality of soil conductivity data values, each at one of a plurality of respective selected surface locations in the defined site; and logging the soil conductivity data values at the selected surface locations in the defined site into a predetermined storage device.

2. The method of claim 1, wherein the step of scanning comprises the steps of;

selecting surface locations corresponding to positions on a predetermined grid overlaying a map of the defined site; and taking a measurement data value of soil conductivity at each selected surface location.

3. The method of claim 1, wherein the step of logging comprises the steps of:

fixing the data value in a stored from; and associating a corresponding surface location with each data value.

4. The method of claim 3, wherein the step of associating a corresponding surface location with each data value comprises the steps of:

associating a global positioning system (GPS) locating device with the portable magnetometer;

coupling an output having coordinate information from the GPS device to the portable magnetometer; and storing the coordinate information for the portable magnetometer with the data values fixed into stored form.

5. The method of claim 1, wherein the step of correlating comprises the steps of:

applying a conversion approximation to the soil conductivity data values to estimate the level of soluble sulfates;

adjusting the estimated level of soluble sulfates for the level of sodium chloride in the soil of the defined site; and mapping accumulated soil conductivity data values stored into one of a first set or a second set of data values onto a site map, wherein each data value in each first or second set is associated with a corresponding surface location.

6. The method of claim 5, wherein the step of applying a conversion approximation comprises the step of:

associating a level of soluble sulfates of 3000 parts per million (ppm) with a measured soil conductivity data value of 280 milliSiemens per meter.

7. The method of claim 5, wherein the step of adjusting the estimated level comprises the step of:

dividing the estimated level by a factor given by the average of the number of soluble sulfates divided by the total number (soluble sulfates+sodium chloride ions) of soluble ions in the soil of each of a plurality of representative soil samples of the defined site as determined by laboratory analysis of the representative soil samples from the defined site.

8. The method of claim 5, wherein, in the step of mapping, data values below a predetermined threshold are stored in the first set and data values equal to or above the predetermined threshold are stored in the second set.

9. The method of claim 8, wherein the predetermined threshold is a concentration of soluble sulfates of 3000 parts per million.

10. The method of claim 1, wherein the step of recommending comprises the steps of:

recommending a calcium-based soil stabilizing protocol if the estimated level of soluble sulfates is less than 3000 ppm.

11. The method of claim 1, wherein the step of performing a laboratory analysis comprises the step of:

performing a laboratory analysis of soil samples from selected portions of the defined site wherein the estimated soluble sulfate concentration equals or exceeds 3000 ppm; and updating the soil conductivity data values logged during the step of obtaining.

12. The method of claim 1, wherein the steps of scanning and logging are performed by a single portable magnetometer, easily carried by one person and which provides a real time readout of the soil conductivity data values.

13. The method of claim 1, wherein the steps of obtaining and correlating are performed automatically under the control of a computer coupled via a computer interface to the portable magnetometer.

14. The method of claim 13, wherein the computer interface comprises a data link between the computer and the portable magnetometer.

15. The method of claim 1, wherein, after the step of obtaining, further comprising the steps of:

establishing a data interface between a portable magnetometer used to obtain the soil conductivity values and a computer used to control the operation of the portable magnetometer; and coupling a global positioning system (GPS) device to the portable magnetometer for providing to the computer via the data interface location data corresponding to each soil conductivity data value for use in mapping the data values for the defined site.

* * * * *